UNITED STATES PATENT OFFICE.

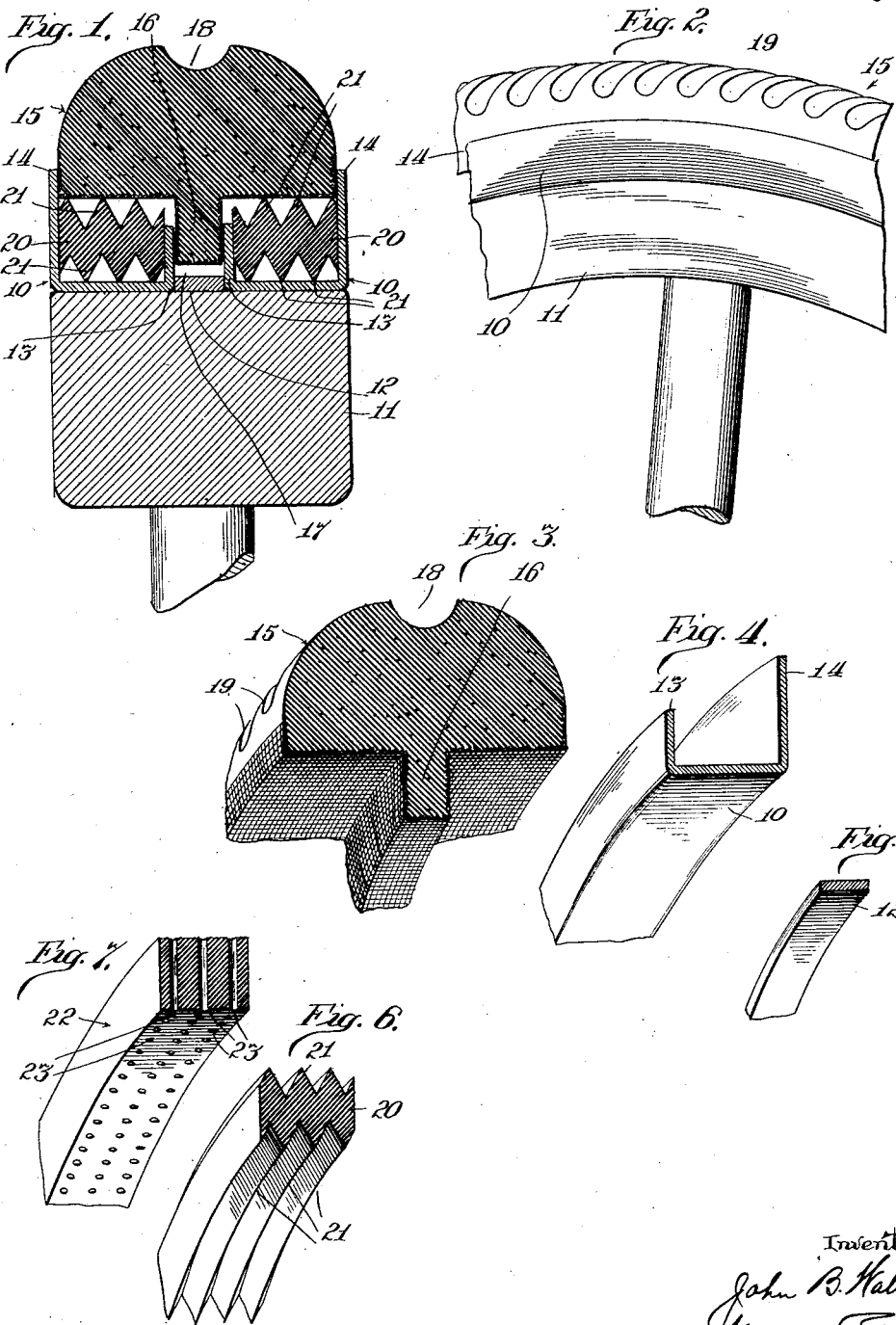

JOHN B. WALLACE, OF MUKWONAGO, WISCONSIN.

TIRE.

1,409,263.  Specification of Letters Patent.  Patented Mar. 14, 1922.

Application filed April 8, 1920. Serial No. 372,173.

*To all whom it may concern:*

Be it known that I, JOHN B. WALLACE, a citizen of the United States, and resident of Mukwonago, in the county of Waukesha and State of Wisconsin, have invented certain new and useful Improvements in Tires, of which the following is a description, reference being had to the accompanying drawing, which forms a part of my specification.

My invention relates to a rubber tire for automobiles and trucks, which will possess great resiliency and absorb the shocks and vibrations encountered, while at the same time eliminating the weakness inherent in pneumatic tires and the annoyances resulting from their use.

The object of my invention is to provide a tire which eliminates the use of an air chamber or casing, by employing a solid rubber tread member, in conjunction with a second member or cushion of soft, live rubber, which is substantially semi-fluid in action; the tread member and cushion member being so formed and related that the shocks encountered by the tire are primarily absorbed through the distortion of portions of both members and ultimately by the spreading of both members; the construction thus at the same time obviating the use of springs.

Another object of my invention is to provide a construction which may be readily applied to the felly of a wheel without necessitating any change in the general wheel construction; the purposes and advantages of the invention being readily comprehended from the following description of the drawing, wherein:—

Figure 1 is a cross sectional view of one form of my improved tire shown applied to the felly of a wheel.

Figure 2 is a side elevation of a segment of a wheel provided with my improved tire as disclosed in Figure 1.

Figure 3 is a perspective view of a segment of the tread member of my improved tire.

Figure 4 is a perspective view of a segment of one of the metallic members or rims.

Figure 5 is a detail view, in perspective, of a second or intermediate metallic member or rim.

Figure 6 is a perspective view of a portion of the resilient inner member or cushion.

Figure 7 is a similar view of a modified form of resilient inner member or cushion.

My invention in the specific exemplification as disclosed in Figure 1 comprises a pair of channel members or metallic rims 10, 10 adapted to be secured on the felly 11 of the wheel in any suitable manner; the two channel members 10, 10 being maintained in spaced relation by an intermediate metallic member or rim 12 which may be secured to the felly in any suitable manner before the second channel member or rim 10 is put into place.

The channel members or rims 10, 10, which are alike in construction, are preferably each provided with one side wall 13 of less height than the other side wall 14, as more clearly shown in Figure 4; the high side wall 14 being intended to be located on the outside of the tire as shown in Figure 1, so as to have the walls 14 of both channel members 10 somewhat overlap the sides of the tread member 15.

The tread member 15 is composed of solid rubber of any desired thickness, moulded or formed with a projecting lip or flange 16 on the lower surface of the tread member, preferably at the point centrally between the sides and of depth preferably somewhat greater than the height of the smaller side walls 13 of the channel members 10, 10, and yet at the same time of such depth as not to contact with the intermediate rim 12, but to normally leave a space as at 17 in Figure 1.

The tread member 15 is preferably provided on its outer surface with grooves disposed circumferentially and transversely of the tread member as shown at 18 and 19 in Figure 3; the various grooves being of depth sufficient to permit local distortion of the tread when subjected to impacts of sufficient force.

The channel members 10 are each provided with a yielding element or cushion 20, composed of live, comparatively soft rubber, moulded or vulcanized into continuous bands, of such width as to form firm contact with the side walls of the channel when they are stretched or forced into the channels or flanged rim members 10. The cushion members 20 preferably have their inner and outer peripheries fluted circumferentially so as to provide a plurality of circumferentially extending ribs 21, inverted V-shape in cross-section as shown in Figures 1 and 6; with the ribs on the outer periphery arranged in off-set relation with the ribs on the inner periphery; that is, with the apices of the ribs 21 on the outer periphery of the cushion member disposed in circumferential alignment with the centers or apices of the grooves intermediate of the ribs 21 on the inner periphery of the cushion member 20.

It is apparent that with this arrangement or formation of the cushion members 20, a considerable local displacement or distortion of different portions of the cushion may take place and therefore enable a considerable absorption of the impacts or blows to be effected.

In practice, one channel member 10 is pressed or otherwise suitably secured in place on the perimeter of the felly 11 adjacent one side thereof, with the side wall 14 disposed to the outside, and the band of soft, live rubber or cushion 20 placed therein by stretching or forcing it over the short side wall 13. After the one channel 10 has been put into place, the flat ring or metal band 12 is then secured in place substantially at the circumferential center of the felly as shown in Figure 1; after which the tread member 15 is put into place, with its base resting on the tips or apices of the ribs 21 of cushion member 20; the cushion members being of such thickness as to normally extend above the inner or short side walls 13 of the channel members 10, as shown in Figure 1. The tread member 15 is placed against the side wall 14 of the channel member; while its circumferential rib 16 is normally in spaced relation with the flat ring or rim 12. With one channel 10, containing its cushion member 20, flat rim 12 and the tread member 15 having been put into place, the second channel 10 with its cushion member 20 is then inserted into place and secured to the felly so as to have the large side wall 14 arranged on the outside in lapping relation with the side of the tread member 15.

As is apparent from the construction shown and described, the impacts or shocks to which the tire is subjected will be primarily absorbed by the flexing or distortion of the interstitial surfaces with which the tread member 15 and the cushion members 20, 20 are provided, while the heavier impacts will be further absorbed by the distortion of all of the elements or resilient members, thereby providing a very resilient tire; while overloads will result in the projecting lip or flange 16 on the bottom of the tread to become "seated" on the rim 12, at which time a substantially solid tire is produced adapted to withstand the excessive loads or strains.

In Figure 7 I show a modified form of cushion member 22, which consists of a strip or band of soft "live" rubber of substantial thickness and width to adapt it to fit into the channel members 10. The cushion member 22 differs merely from the cushion members 20, in that instead of being provided with the fluted or corrugated surfaces 21, it is made foraminous; that is to say, the interstitial surfaces are provided by the perforations 23, which permit considerably flexing of the cushion member 22 by distortion through the displacement of the material. This cushion member 22 may be substituted for the cushion members 20, 20 previously described and shown in Figure 1.

The constructions shown and described I believe to be the simplest and best embodiments of my invention, but modifications may be made in certain details of construction without, however, departing from the spirit of the invention.

What I wish to secure by Letters Patent is:—

1. A tire, comprising an annular channel portion, a pair of inner cushion members of soft "live" rubber disposed circumferentially within the channel portion, said members being provided with interstitial surfaces adapted to permit local displacement, and a continuous tread member of resilient material seated on said cushion members and provided on its inner periphery with a rib disposed between the pair of cushion members.

2. A tire, comprising a pair of annular channels adapted to be secured on the felly of a wheel, a spacing ring secured to the felly intermediate of the channels, a cushion member of soft "live" rubber seated in each channel in firm relation with the side walls thereof and provided with interstitial surfaces adapted to permit displacement of the material, and a tread member seated on both channels and provided with a rib disposed between the two channels and said cushion members.

3. A tire, comprising an annular channel portion, a pair of cushion members of soft "live" rubber disposed circumferentially within the channel portion and provided with interstitial surfaces adapted to permit displacement of the material, and a continuous tread member of resilient material seated on said cushion members and provided with a rib disposed between the cushion members but normally out of contact with the bottom of the channel portion, said tread member being provided with an interstitial surface.

4. A tire, comprising a pair of annular channels adapted to be secured, side by side, on the felly of a wheel, the inner side walls of both channels being of less height than the outer side walls thereof, a spacing ring secured to the felly intermediate of the channels, a cushion member of soft "live" rubber seated in each channel and provided with a series of circumferential ribs adapted to extend above the inner side walls of the channels, and a tread member of resilient material and of width substantially equal to that of the felly so as to be disposed across the ribs of both cushion members and to rest thereon within the outer side walls of both channels, said tread member being provided with a continuous rib disposed on the inner circumference centrally between the sides of the tread-member, with the rib extending between the side walls of the two channels.

JOHN B. WALLACE.

Witnesses:
G. HEIDMAN,
F. A. FLORELL.